(12) United States Patent
Hoydis et al.

(10) Patent No.: US 11,888,672 B2
(45) Date of Patent: Jan. 30, 2024

(54) PREDICTING DECODABILITY OF RECEIVED DATA

(71) Applicant: NOKIA TECHNOLOGIES OY, Espoo (FI)

(72) Inventors: Jakob Hoydis, Paris (FR); Vahid Aref, Stuttgart (DE); Ahmed Elkelesh, Stuttgart (DE); Sebastian Cammerer, Tübingen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/541,522

(22) Filed: Dec. 3, 2021

(65) Prior Publication Data

US 2022/0191079 A1    Jun. 16, 2022

(30) Foreign Application Priority Data

Dec. 15, 2020    (FI) ...................................... 20206306

(51) Int. Cl.
*H04L 27/26*    (2006.01)
*H04L 1/20*    (2006.01)
*H04L 5/00*    (2006.01)

(52) U.S. Cl.
CPC .......... *H04L 27/2649* (2013.01); *H04L 1/206* (2013.01); *H04L 5/0055* (2013.01)

(58) Field of Classification Search
CPC .... H04L 27/2649; H04L 1/206; H04L 5/0055
See application file for complete search history.

(56) References Cited

U.S. PATENT DOCUMENTS

| | | | |
|---|---|---|---|
| 2010/0202334 A1* | 8/2010 | Soliman | H04L 1/0009 375/295 |
| 2019/0230667 A1* | 7/2019 | Loehr | H04L 1/0078 |
| 2019/0273574 A1* | 9/2019 | Goektepe | H04L 1/0045 |
| 2020/0045635 A1* | 2/2020 | Lin | H04W 52/0235 |
| 2020/0083989 A1* | 3/2020 | Göktepe | H04L 1/1816 |

* cited by examiner

*Primary Examiner* — Janice N Tieu
(74) *Attorney, Agent, or Firm* — SQUIRE PATTON BOGGS (US) LLP

(57) ABSTRACT

Different solutions for an apparatus comprising a predictor predicting decodability of received symbols are disclosed. Decoding is performed based on the prediction.

18 Claims, 9 Drawing Sheets

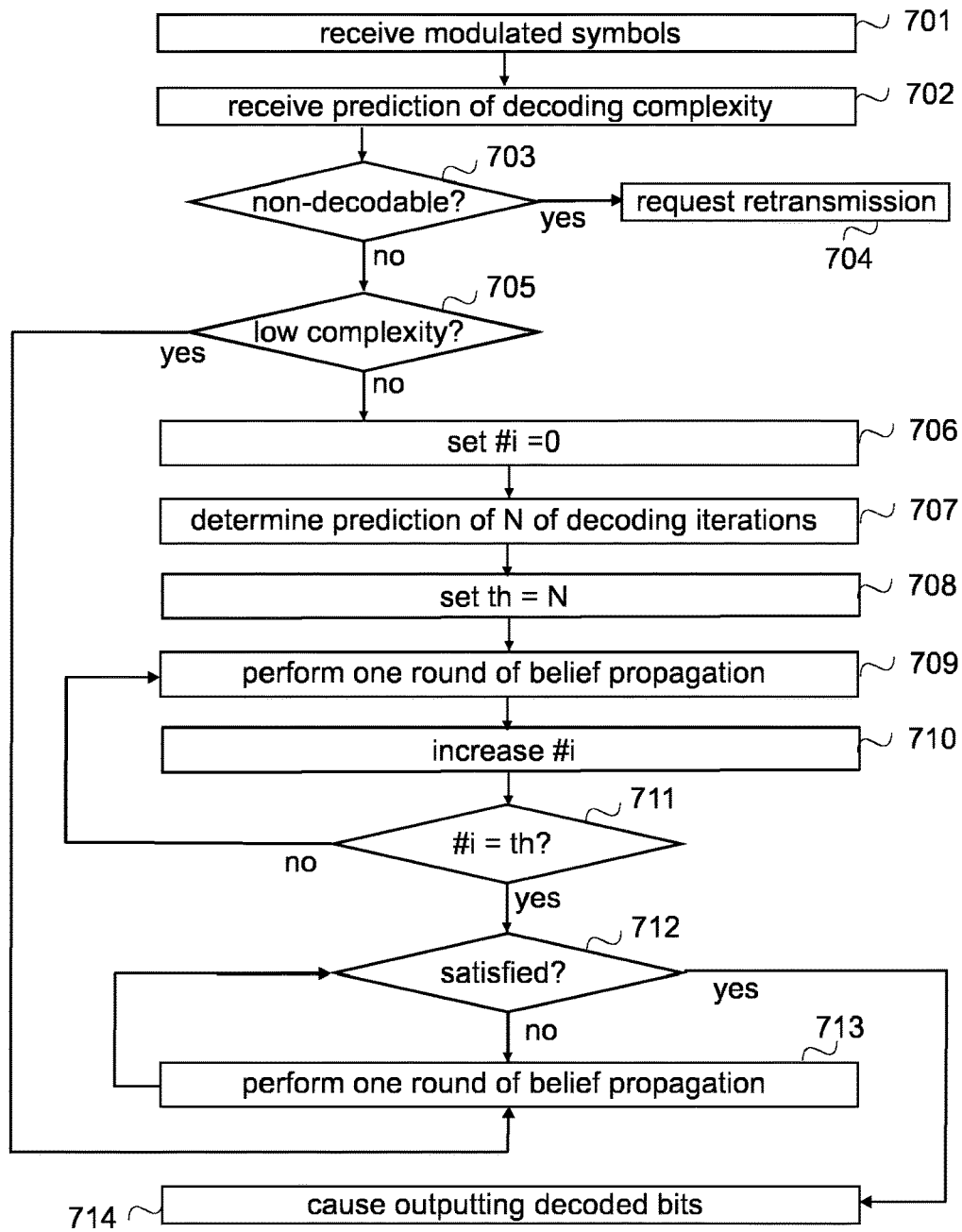

PREDICTING DECODABILITY OF RECEIVED DATA

TECHNICAL FIELD

Various example embodiments relate to wireless communications and, particularly, predicting decodability of received transmissions.

BACKGROUND

Wireless communication systems are under constant development. For example, the wireless networks are expected to provide extremely high throughput and ultra-low latency services. Different processing phases of data sent over a wireless connection, such as decoding of the data, consume some time and thereby may affect to latency, for example.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising at least one processor; and at least one memory including computer program code, the at least one memory and computer program code configured to, with the at least one processor, cause the apparatus at least to perform: receiving modulated symbols over a channel; predicting decodability of the modulated symbols; and determining, based on the decodability, decoding of the received modulated symbols.

In an embodiment, the at least one memory and computer program code are configured to, with the at least one processor, cause the apparatus further to perform: predicting decodability by classifying, using a machine learning model, the received modulated symbols to one class of classes indicating complexity of decoding.

In an embodiment, the at least one memory and computer program code are configured to, with the at least one processor, cause the apparatus further to perform: requesting a retransmission in response to the class indicating non-decodable.

In an embodiment, the at least one memory and computer program code configured to, with the at least one processor, cause the apparatus further to perform: performing, in response to the class indicating low complexity of decoding, decoding by repeating one round of decoding and checking whether a stop criterium is satisfied until the stop criterium is satisfied.

In an embodiment, the at least one memory and computer program code are configured to, with the at least one processor, cause the apparatus further to perform: performing, in response to the class indicating high complexity of decoding, a predetermined number of rounds of decoding before checking whether a stop criterium of the decoding is satisfied.

In an embodiment, the at least one memory and computer program code are configured to, with the at least one processor, cause the apparatus further to perform: determining a predicted number of rounds of decoding needed; and performing, in response to the class indicating high complexity of decoding, a number of rounds of decoding before checking whether a stop criterium of the decoding is satisfied, wherein the number of rounds is based on the predicted number of rounds.

In an embodiment, the at least one memory and computer program code configured to, with the at least one processor, cause the apparatus further to perform: predicting decodability by determining a predicted number of rounds of decoding needed.

In an embodiment, the at least one memory and computer program code configured to, with the at least one processor, cause the apparatus further to perform: requesting a retransmission in response to the predicted number exceeding a predetermined threshold.

In an embodiment, the at least one memory and computer program code configured to, with the at least one processor, cause the apparatus further to perform: performing a number of rounds of decoding before checking whether a stop criterium of decoding is satisfied, wherein the number of rounds is based on the predicted number of rounds.

In an embodiment, the at least one memory and computer program code configured to, with the at least one processor, cause the apparatus further to perform: determining the predicted number of rounds by using a machine learning model or using information indicating channel quality of the channel and a look-up table.

In an embodiment, the at least one memory and computer program code configured to, with the at least one processor, cause the apparatus further to perform determining a decoder to use for decoding the received modulated symbols based on the decodability.

According to an aspect there is provided an apparatus comprising at least one processor; and at least one memory including computer program code, the at least one memory and computer program code configured to, with the at least one processor, cause the apparatus at least to perform: acquiring a model modeling at least a predictor predicting decodability of received data using an algorithm with trainable parameters; initializing trainable parameters for the algorithm; collecting labeled training data comprising plurality of pairs of noisy codewords and number of decoding iteration rounds; inputting samples of noisy codewords in the training data to the model; updating the trainable parameters by applying at least cross entropy loss function; training the trainable parameters by repeating the inputting and updating until a stop criterion is fulfilled; stopping the training when the stop criterion is fulfilled; and storing, after stopping the training, a machine learning model for the predictor.

According to an aspect there is provided a method comprising: receiving modulated symbols over a channel; predicting decodability of the modulated symbols; and determining, based on the decodability, decoding of the received modulated symbols.

According to an aspect there is provided a method comprising: acquiring a model modeling at least a predictor predicting decodability of received data using an algorithm with trainable parameters; initializing trainable parameters for the algorithm; collecting labeled training data comprising plurality of pairs of noisy codewords and number of decoding iteration rounds; inputting samples of noisy codewords in the training data to the model; updating the trainable parameters by applying at least cross entropy loss function; training the trainable parameters by repeating the inputting and updating until a stop criterion is fulfilled; stopping the training when the stop criterion is fulfilled; and storing, after stopping the training, a machine learning model for the predictor.

According to an aspect there is provided a computer program comprising instructions which, when the program is executed by an apparatus, cause the apparatus to carry out at least: predicting, in response to receiving modulated symbols over a channel, decodability of the modulated symbols; and determining, based on the decodability, decoding of the received modulated symbols.

According to an aspect there is provided a computer program comprising instructions which, when the program is executed by an apparatus, cause the apparatus to carry out at least: acquiring a model modeling at least a predictor predicting decodability of received data using an algorithm with trainable parameters; initializing trainable parameters for the algorithm; collecting labeled training data comprising plurality of pairs of noisy codewords and number of decoding iteration rounds; inputting samples of noisy codewords in the training data to the model; updating the trainable parameters by applying at least cross entropy loss function; training the trainable parameters by repeating the inputting and updating until a stop criterion is fulfilled; stopping the training when the stop criterion is fulfilled; and storing, after stopping the training, a machine learning model for the predictor.

According to an aspect there is provided a computer-readable medium comprising program instructions, which, when run by an apparatus, causes the apparatus to to carry out at least: predicting, in response to receiving modulated symbols over a channel, decodability of the modulated symbols; and determining, based on the decodability, decoding of the received modulated symbols.

According to an aspect there is provided a computer-readable medium comprising program instructions, which, when run by an apparatus, causes the apparatus to to carry out at least: acquiring a model modeling at least a predictor predicting decodability of received data using an algorithm with trainable parameters; initializing trainable parameters for the algorithm; collecting labeled training data comprising plurality of pairs of noisy codewords and number of decoding iteration rounds; inputting samples of noisy codewords in the training data to the model; updating the trainable parameters by applying at least cross entropy loss function; training the trainable parameters by repeating the inputting and updating until a stop criterion is fulfilled; stopping the training when the stop criterion is fulfilled; and storing, after stopping the training, a machine learning model for the predictor.

According to an aspect there is provided a non-transitory computer-readable medium comprising program instructions, which, when run by an apparatus, causes the apparatus to to carry out at least: predicting, in response to receiving modulated symbols over a channel, decodability of the modulated symbols; and determining, based on the decodability, decoding of the received modulated symbols.

According to an aspect there is provided a non-transitory computer-readable medium comprising program instructions, which, when run by an apparatus, causes the apparatus to to carry out at least: acquiring a model modeling at least a predictor predicting decodability of received data using an algorithm with trainable parameters; initializing trainable parameters for the algorithm; collecting labeled training data comprising plurality of pairs of noisy codewords and number of decoding iteration rounds; inputting samples of noisy codewords in the training data to the model; updating the trainable parameters by applying at least cross entropy loss function; training the trainable parameters by repeating the inputting and updating until a stop criterion is fulfilled; stopping the training when the stop criterion is fulfilled; and storing, after stopping the training, a machine learning model for the predictor.

BRIEF DESCRIPTION OF DRAWINGS

Embodiments are described below, by way of example only, with reference to the accompanying drawings, in which

FIGS. 6 to 14 illustrate example functionalities of an apparatus;

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
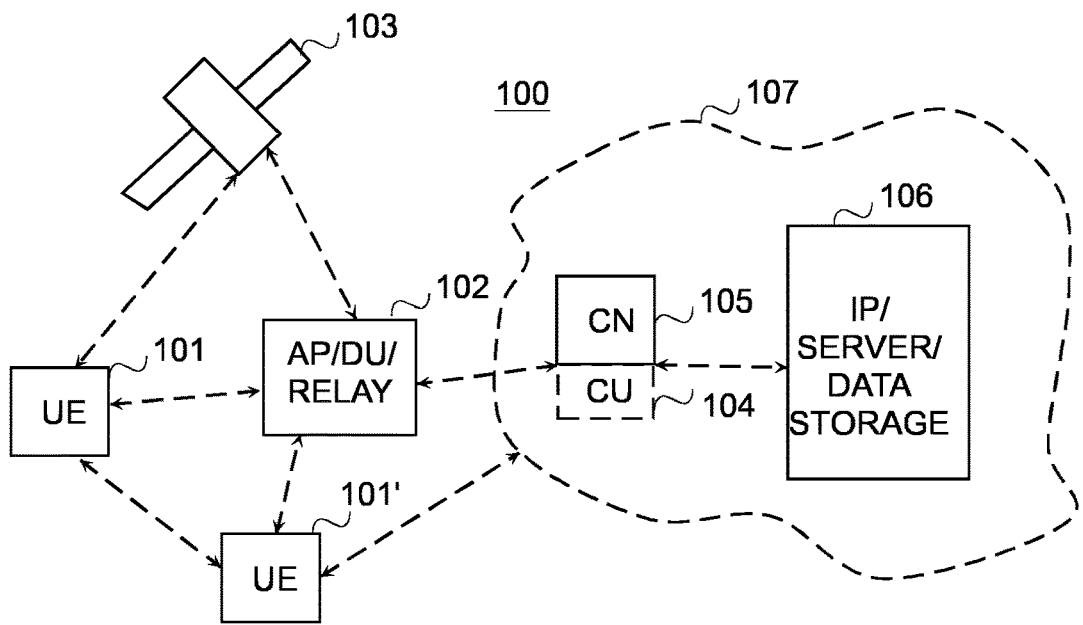
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/ mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g) Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
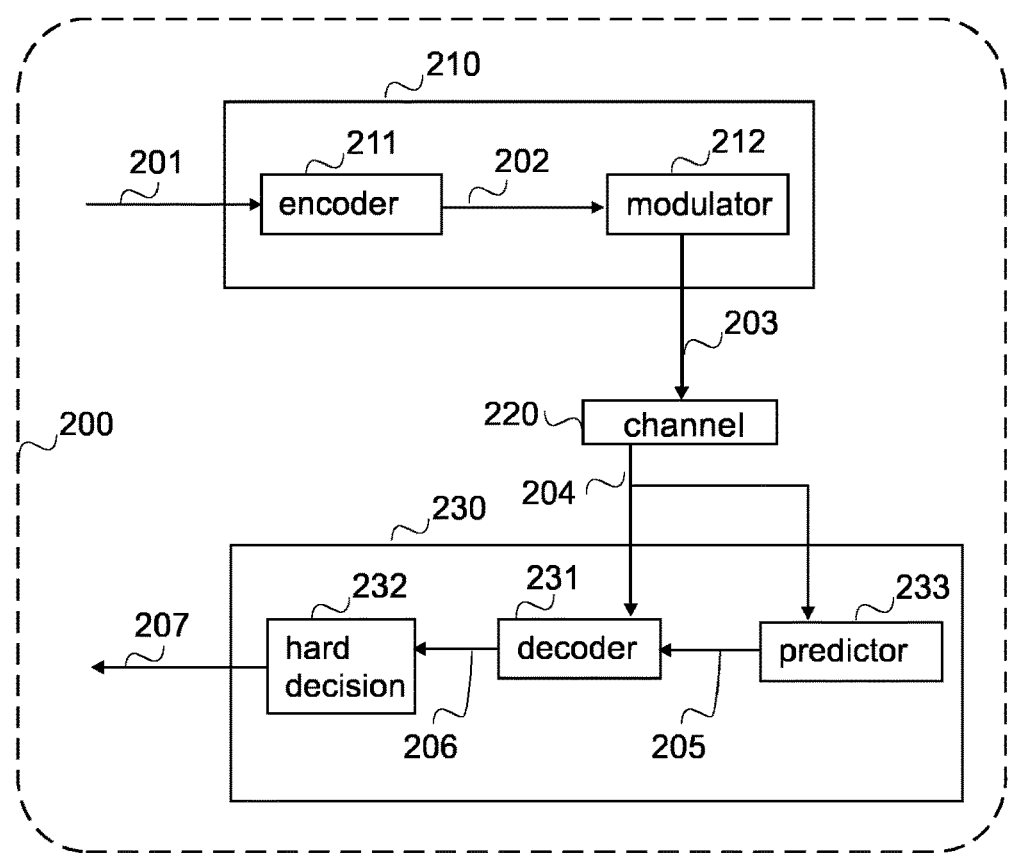
FIG. 2 illustrates another simplified example of systems.

FIG. 2 illustrates a general principles of data transmission in a communication system. The system 200 reflects a real-world system, used when modeling the system to generate an entity predicting decodability of received transmissions. For the sake of clarity, component names in the real-world system are used to refer to different models of the components. Further, below different examples are described using short low-density parity-check (LPDC) codes as an example without limiting the examples to short low-density parity check codes. For example, a code having less than 500 bits can be interpreted to be a short low-density parity check code; long low-density parity check codes may be tens of thousands of bits long, for example in 64800 bits in Digital Video Broadcasting—Second Generation Terrestrial (DVB-T2) standard. To implement the disclosed examples to other kind of codes (coding schemes) is straightforward for one skilled in the art.

Referring to FIG. 2, the system 200 comprises a transmitter 210, a channel 220 between the transmitter and a receiver 230, and the receiver 230. It should be appreciated that a transmitter 210 means herein an apparatus comprising the transmitter 210 and the receiver 230 means herein an apparatus comprising the receiver 230, and that an apparatus may comprise the transmitter 210 and the receiver 230.

The transmitter 210 comprises a channel encoder 211 to which a stream of bits 201 is input. When modeling the system, the input 201 may be a block of k bits, i.e. a vector of k information bits, generated by a random bit generator, which models a source of transmission. When modeling the system, the probability of a bit value "0" may be equal to the probability of a bit value "1". The channel encoder 211 generates from the stream of bits 201 a stream of codewords 202. The channel encoder 211 may use the low-density parity-check coding, or any other channel coding scheme, to generate the stream of codewords 202. The vector of k information bits may be coded to a codeword x of length n. The stream of codewords 202 is input to a modulator 212.

The modulator 212 implements a modulation scheme, for example a binary phase shift keying (BPSK), to map the stream of codewords, or a codeword, to complex baseband channel symbols 203 which are fed via the channel 220 towards the receiver 230. For example, the binary phase shift keying maps the bit "0" to "+1", and the bit "1" to "−1".

The channel 220 may be modeled by an additive white Gaussian noise channel in which Gaussian noise with zero means and a noise variance $\sigma^2$ is added to the transmission 203, the result, i.e. output 204 of the channel 220, being symbols, for example a noisy codeword y of length n. The noise variance may directly relate to information indicating channel quality, for example to a signal-to-noise ratio (SNR), and/or to an estimation of channel state information (CSI) and/or to a link quality indicator (LQI). The output 204 (the noisy transmission/noisy codeword y) of the channel may be a sum of the codeword 203 and noise.

The receiver 230 comprises a predictor 233, a decoder 231 and a hard decision unit 232. The predictor may be implemented in a plurality of ways.

In an implementation, the predictor 233 may be a look-up-table based Monte-Carlo simulation unit that is configured to store an average number of decoding iterations per channel quality information. For example, when signal-to-noise ratio is known, the receiver may use it to obtain a corresponding average number of decoding iterations, and to use it as a prediction of decodability. The described approach enables to have look-up-tables for short low-density parity check codes, the conventional statistical techniques to generate look-up tables do not work well with short low-density parity check codes. Generating a look-up table using Monte-Carlo simulation unit is interpreted herein as training.

In other implementations, the predictor 233 is based on one or more machine learning model(s) to discover meaningful patterns of interest, for example one or more neural networks, or support-vector machines, or a boosted tree algorithm, or any corresponding classifier algorithm. A machine learning model-based predictor 233 comprises, in the training phase, one or more algorithms with trainable parameters θ for predicting decodability, and in use, after the training, correspondingly one or more machine learning models with trained parameters. A machine learning model with trained parameters is called herein simply a machine learning model, and it could be called a trained machine learning model, or a trained model, or a trained model based on an algorithm with trainable parameters for predicting decodability.

A machine learning based predictor 233, for example a neural network-based predictor 233, may be a ternary classifier, which may classify a noisy transmission (a noisy codeword y) to one of three output classes, which predict decodability of the noisy transmission. For example, the output classes may be "no decoding", "low complexity of decoding" (shortly "low complexity"), and "high complexity of decoding" (shortly "high complexity"). For example, when an automatic repeat request (ARQ) procedure is used and the maximum number of iteration rounds the receiver is configured to perform before requesting resending is 20, following may be used: if a predicted number of iterations is 1-4, the predictor outputs "low complexity", if a predicted number of iterations is 5-20 iterations, the predictor outputs "high complexity", and if a predicted number of iterations is 21 or more iterations, the predictor outputs "no decoding". Naturally another type of classifier with any number of output classes and/or any other classifying criteria may be used.

Another example of a machine learning-based predictor 233 is a classifier having a plurality of output classes, outputting a prediction for a number of decoding iteration rounds needed to decode the noisy transmission. For example, when the automatic repeat request (ARQ) procedure is used and the maximum number of iteration rounds the receiver is configured to perform before requesting resending is 20, there may be 21 classes, classes 1 to 20 outputting a corresponding number as a prediction, class 21 outputting number 21 and including cases in which 21 or more iteration rounds are needed.

In further implementations a predictor may comprise two or more of the above described predictors. For example, the ternary classifier may be used first, and then, if the complexity is high, then the predictor outputting a prediction for the number of the decoding iteration rounds, or the look-up table may be used.

The channel output 204, i.e. the noisy codeword y (noisy transmission) is input to a decoder 231, which decodes the input 204 to improved log-likelihood ratios 206 using a channel decoding algorithm, for example a flooding belief propagation. The hard decision unit 232 converts outputs 206 from the decoder to estimated bits, and thereby to an estimated codeword x̌ (estimated transmitted data).

Figure 3:
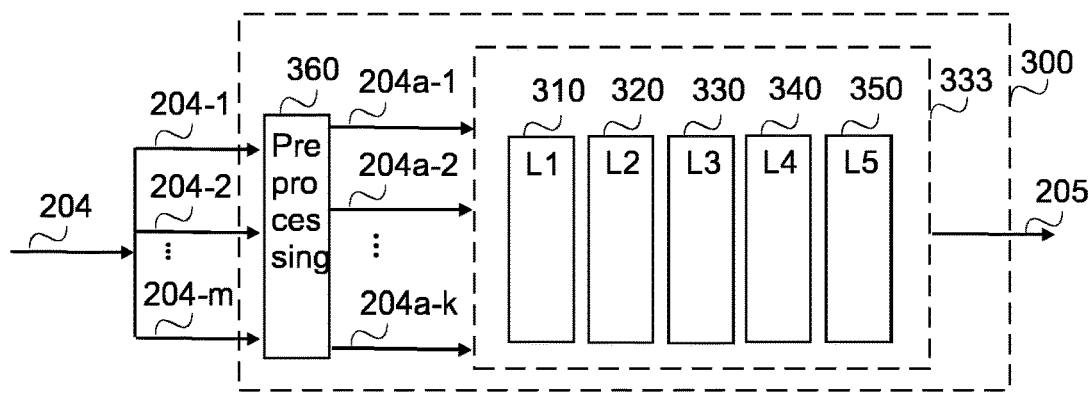
FIGS. 3 and 4 illustrate examples of predictor architecture.

FIG. 3 illustrates an example of a predictor architecture 300 for a machine learning model for a predictor, which is an example of a neural network-based predictor. Naturally any other type of neural network with any number and type of layers can be used for a neural network-based predictor. In the illustrated example of FIG. 3, the predictor comprises a pre-processing unit 360 and a neural network 333. In the illustrated example, the neural network is a five-layer 310, 320, 330, 340, 350 neural network consisting of a parametric function $f_\theta$ with trainable parameters θ. The parameters are weight matrices and biases of the dense layers of the neural network in the illustrated example. In the illustrated example, the first layer 310 is an input layer, the second layer 320, the third layer 330 and the fourth layer 340 are hidden dense layers and the fifth layer 350 is a dense layer with a softmax activation for classification, and provides the output. The layers comprise, per a layer, a non-linear activation function, for example a rectified linear unit (ReLU), a dense weight matrix, biases and activation units for output nodes, wherein the nonlinear activation function is applied after matrix multiplication of layer inputs plus biases. For example, assuming that the input layer essentially corresponds input, for LDPC codes with a code length 128, a code dimension 64 and a code rate 0.5, the number of neurons in the second layer may be 128, the number of neurons in the third layer may be 64 and the number of neurons in the fourth layer may be 32.

The noisy codeword y 204 is a vector y of length m, comprising m elements 204-1, 204-2, 204-*m*. The pre-processing unit pre-processes them to some quantities (features) 204*a*-1, 204*a*-2, 204*a*-*k*, based on the log-likelihood of the noisy codeword y (vector y), the quantities (features) being conveyed from the noisy codeword and containing no additional information. For example, following quantities (features) may be outputs of the pre-processing unit:

log likelihood ratio vector corresponding to the noisy codeword y (vector y)
absolute of the log likelihood ratio vector
mean of the log likelihood ratio vector
mean of the absolute of the log likelihood ratio vector
absolute of the mean of the log likelihood ratio vector
second order moment of the log likelihood ratio vector
variance of the log likelihood ratio vector
maximum of the log likelihood ratio vector
minimum of the log likelihood ratio vector
Hamming weight of a syndrome vector (i.e. a number of non-fulfilled check equations after one-half belief propagation iteration, which in other words is applying a check node update equations once)

The pre-processing unit may be seen as a pre-processing layer in the neural network architecture 300 illustrated in FIG. 3, and its purpose is to simplify the training, and the use of the trained predictor when implemented.

Figure 4:
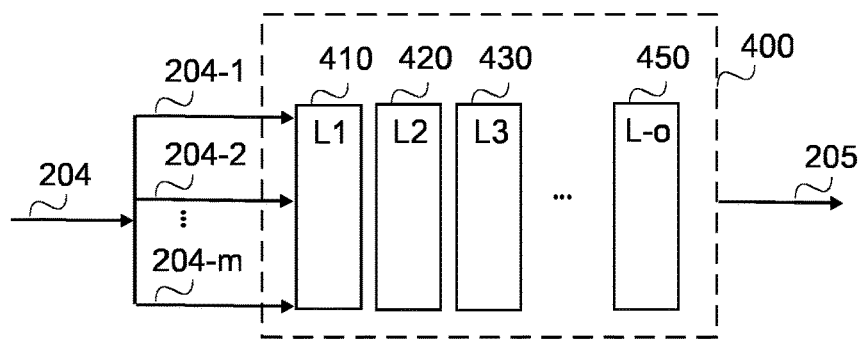

However, as shown in FIG. 4, illustrating another example of a predictor architecture 400 for a machine learning-based predictor, which is based on a neural network, the machine learning-based predictor may be trained and corresponding trained predictor implemented without the pre-processing unit. Since no pre-processing is performed, the neural network may comprise more layers 420, 430 between the input layer 410 and the output layer 450 and/or there will be more neurons in one or more layers as with the example illustrated in FIG. 3. Further, more training may be needed to obtain a machine learning model with the same prediction accuracy as with the example illustrated in FIG. 3.

Even though in FIGS. 2, 3 and 4, the input to the predictor is the noisy codeword y 204, the input may be a sub-part of the noisy codeword y 204 (a sub-part of the vector y).

Figure 5:
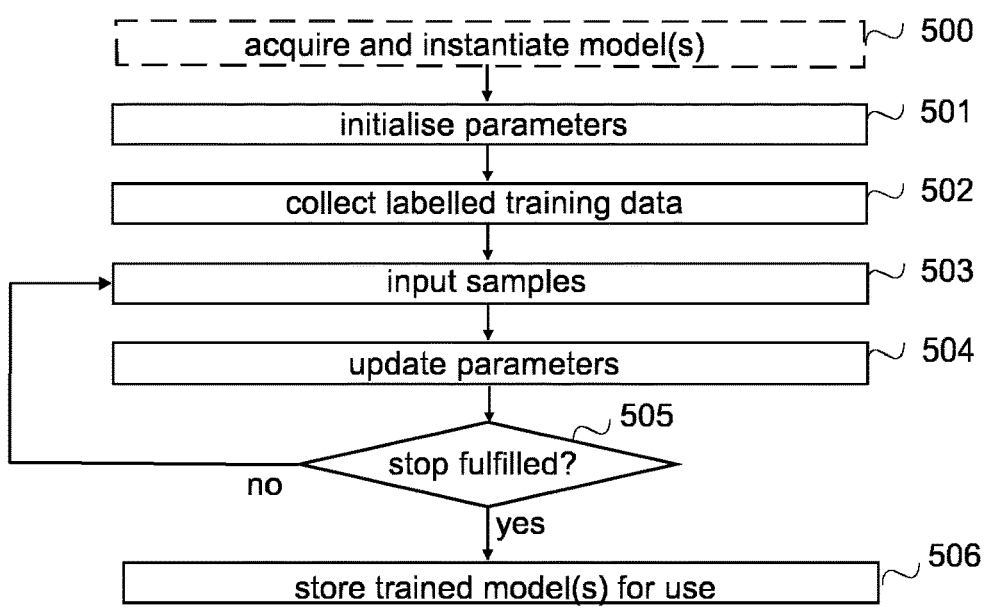
FIG. 5 illustrates an example of a training functionality.

FIG. 5 illustrates an example functionality how a machine learning-based predictor may be trained offline. The predictor is preferably trained offline so that it is ready to be used when deployed in a receiver processing real-time online transmissions. Naturally, it is possible to perform at least part of the training, for example fine tuning, by online training. In the offline training the model is trained using training data, and after training, the learned values of the trainable parameters are stored together with model architecture information, to be deployed in the real environment.

Referring to FIG. 5, the process starts in block 500 by acquiring and instantiating one or more models comprising one or more algorithms with one or more trainable parameters θ, depending on the implementation of the predictor, for example depending on whether different predictors are combined to be one predictor and/or trained together. However, below for the clarity of description, it is assumed that one model for a predictor is trained.

Then the trainable parameters are initialised in block 501. For example, random values may be used to initialise the parameters.

Labelled training data is collected in block 502. For example, it is possible to collect the labelled training data by generating in block 502 randomly at different signal-to-noise levels a plurality of different pairs of noisy codewords y and number of decoding iteration rounds, for example the number of belief propagation iterations, through Monte-Carlo-based simulations, for example. If there is enough stored data on a communication system, which data comprises pairs of an actual received signal (noisy codeword) with a corresponding number of decoding iteration round, for example the number of belief propagation iterations, actually performed, the labeled data may be collected in block 502 by (randomly) selecting the labeled data from the stored data. Still a further possibility is to use labeled data comprising stored pairs of noisy codewords (received signals) and numbers of iteration rounds and generated pairs of noisy codewords and numbers of iteration rounds. Such labelled training data allows flexible definition of classes.

Then samples, i.e. noisy codewords, are input in block 503 to the one or more models, and the parameters are updated in block 504, by applying, for example, Adam's optimizer based on stochastic gradient descent to the dense layers and by applying the cross entropy loss function for the classes.

When the parameters have been updated at block 504, it is checked, in block 505 whether a stop criterion for training is fulfilled. The stop criterion may be that a predefined number of iterations has been performed and/or the value of the loss function, has not decreased during a predefined number of consecutive iterations, or a decrease of the value has been under a threshold during a predefined number of consecutive iterations and/or the value is below a threshold.

If the stop criterion is not fulfilled (block 505: no), the process returns to block 503 to input samples. If the stop criterion is fulfilled (block 505: yes), the trained one or models for a predictor are ready, and is/are stored in block 506 to be used in receivers.

FIGS. 6 to 14 illustrate different example functionalities a receiver, which comprises a predictor, may be configured to perform. In the illustrated examples, the belief propagation is used as an example of a decoding algorithm, or as default decoding algorithm, without limiting the examples to the belief propagation. Use of any other decoding algorithm does not require any changes to the described functionalities.

Referring to FIG. 6, when a stream of modulated symbols is received in block 601, decodability of the modulated symbols is predicted in block 602, and decoding of the modulated symbols is determined in block 603 based on the decodability. The determined decoding may be that instead of starting decoding a retransmission is requested, or the determined decoding may include a number of iteration rounds performed before it is checked, whether further iteration rounds are needed, or legacy decoding (meaning decoding in which an iteration round is followed by a check, whether further iteration rounds are needed).

In the example illustrated in FIG. 7, the predictor in a receiver comprises the ternary classifier which predicts the complexity of decoding by outputting one of three classes, and also a predictor to determine a prediction of a number of decoding iterations needed.

Referring to FIG. 7, when a stream of modulated symbols is received in block 701 in the receiver, prediction of the decoding complexity is received (outputted) in block 702.

If the prediction is "non-decodable" (block 703: yes), the receiver, instead of trying to decode the modulated symbols and thereby wasting some time in trying to decode the modulated symbols without success, sends in block 704 a request for retransmission.

If the prediction is not "non-decodable" (block 703: no), and the prediction is not "low complexity" (block 705: no), the prediction is "high complexity", a variable n, which is the number of iteration rounds, is set to be zero in block 706, and, in the illustrated example, prediction of the number N of decoding iterations needed for decoding the modulated symbols is determined in block 707. This may be performed by inputting the modulated symbols to the machine learning model, or by using the look-up table and channel quality information. When the number (predicted number) N is determined, in the illustrated example a threshold th is set in block 708 to be equal to the predicted number N. In another implementation, the threshold may be set to be smaller than the predicted number N, for example N−1.

Then one round of the belief propagation, i.e. decoding, is performed in block 709 and the variable n, i.e. the number of iteration rounds, is increased by one in block 710. Then it is checked in block 711, whether the number of iteration rounds #i equals to the threshold. If not (block 711: no), the process returns to block 709 to perform one round of the belief propagation.

If the number of iterations rounds #i equals to the threshold (block 711: yes), it is checked in block 712, whether a stop criterium, for example an early stopping condition of the belief propagation, is satisfied. If it is not (block 712: no), one iteration round of the belief propagation is performed in block 713, and the process returns to block 712 to check, whether a stop criterium is satisfied.

Once the stop criterium is satisfied (block 712: yes), outputting the decoded bits is caused in block 714.

If the prediction is "low complexity" (block 705: yes), one iteration round of the belief propagation is performed in block 713, and the process proceeds to block 712 to check, whether a stop criterium is satisfied, and continues therefrom as described above.

As can be seen from the above example, time is saved by performing the check in block 712 after certain number of iteration rounds for modulated symbols predicted to require several iteration rounds.

Figure 8:
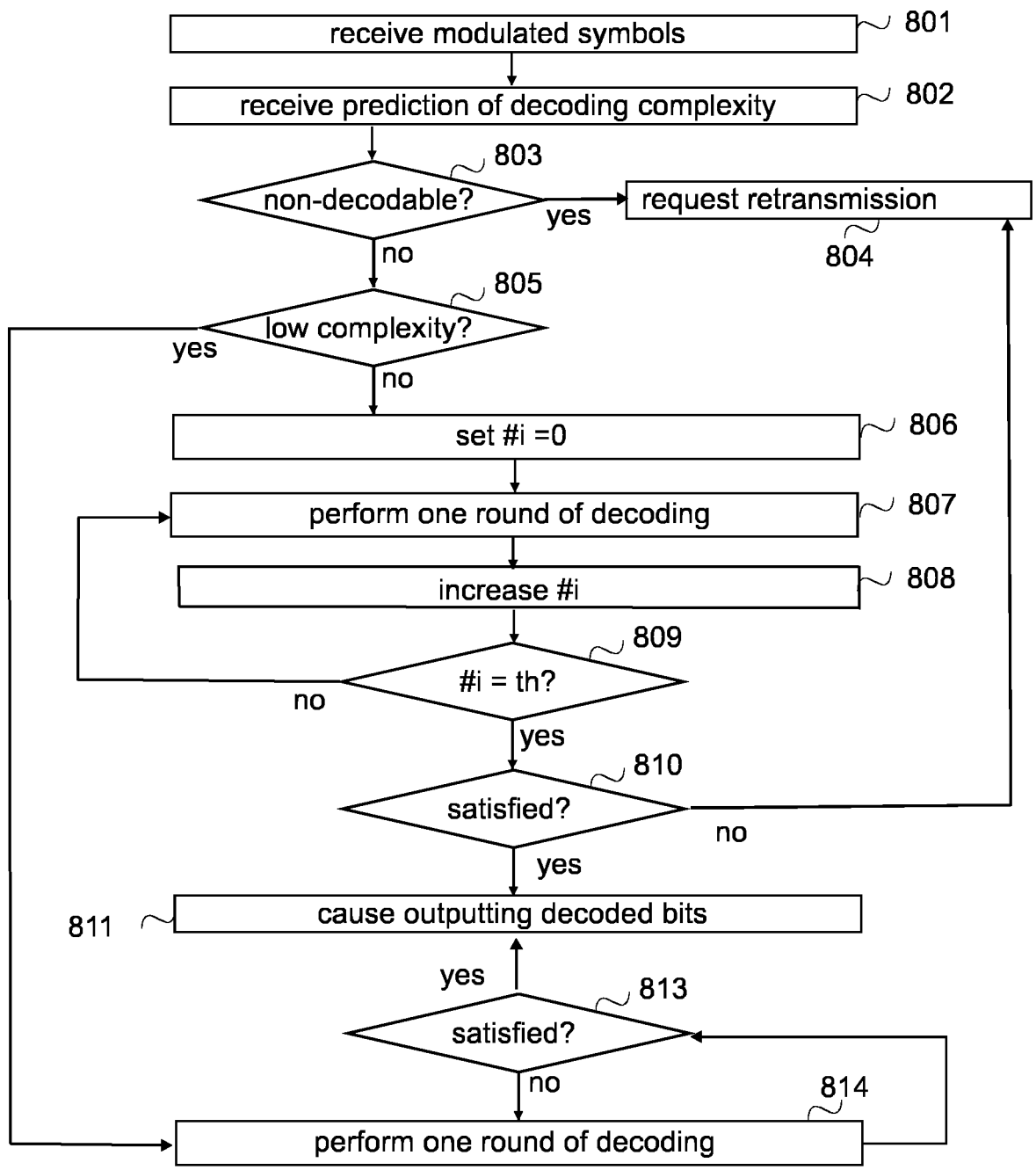

In the example illustrated in FIG. 8, the predictor in a receiver comprises the ternary classifier which predicts the complexity of decoding by outputting one of three classes.

Referring to FIG. 8, when a stream of modulated symbols is received in block 801 in the receiver, prediction of the decoding complexity of the modulated symbols is received (outputted) in block 802.

If the prediction is "non-decodable" (block 803: yes), the receiver, instead of trying to decode the modulated symbols and thereby wasting some time in trying to decode the modulated symbols without success, sends in block 804 a request for retransmission.

If the prediction is not "non-decodable" (block 803: no), and the prediction is not "low complexity" (block 805: no), the prediction is "high complexity", a variable n, which is the number of iteration rounds, is set to be zero in block 806. Then one round of the belief propagation, i.e. decoding, is performed in block 807 and the variable n, i.e. the number of iteration rounds, is increased by one in block 808. Then it is checked in block 809, whether the number of iteration rounds #i equals to a preset threshold. The preset threshold may be the lower limit of rounds classified to the "high complexity" class, or bigger. If the number of iteration rounds #i does not equal to a preset threshold (block 809: no), the process returns to block 807 to perform one round of the belief propagation.

If the number of iterations rounds #i equals to the threshold (block 809: yes), it is checked in block 810, whether a stop criterium, for example an early stopping condition of the belief propagation, is satisfied. If it is not (block 810: no), in the illustrated example the process proceeds to block 804 to send a request for retransmission.

If the stop criterium is satisfied (block 810: yes), outputting the decoded bits is caused in block 811.

If the prediction is "low complexity" (block 805: yes), one iteration round of the belief propagation is performed in block 814, and the process proceeds to block 813 to check, whether a stop criterium is satisfied. If not (block 813: no), the process returns to block 814 to perform one round of the belief propagation.

If the stop criterium is satisfied (block 813: yes), outputting the decoded bits is caused in block 811.

Figure 9:
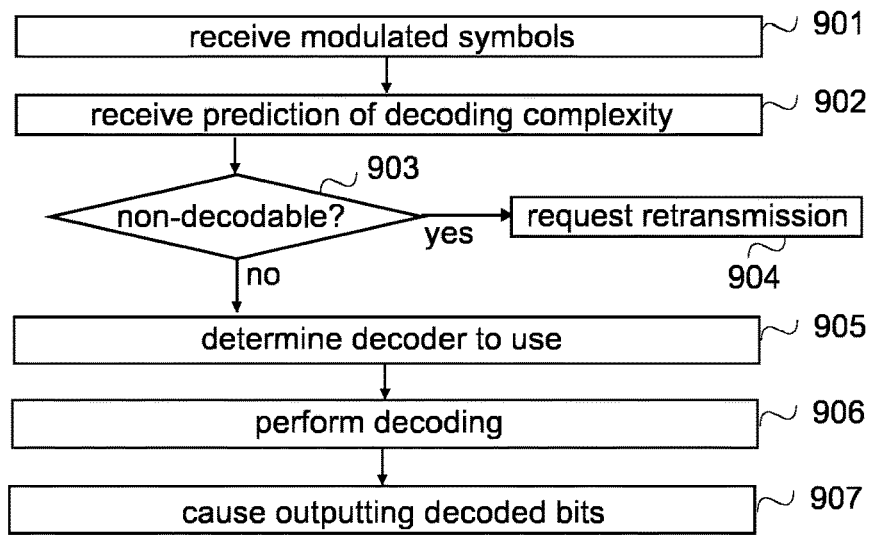

In the example illustrated in FIG. 9, the predictor in a receiver comprises the ternary classifier which predicts the complexity of decoding by outputting one of three classes, and the receiver comprises two or more different decoders which to use.

Referring to FIG. 9, when a stream of modulated symbols is received in block 901 in the receiver, prediction of the decoding complexity of the modulated symbols is received (outputted) in block 902.

If the prediction is "non-decodable" (block 903: yes), the receiver, instead of trying to decode the modulated symbols and thereby wasting some time in trying to decode the modulated symbols without success, sends in block 904 a request for retransmission.

If the prediction is not "non-decodable" (block 903: no), a decoder to use is determined in block 905, based on whether the prediction is "low complexity" or "high complexity". For example, decoding precision of the belief propagation may be determined, or it may be determined, whether to use a min-sum approximation decoder or a layered belief propagation decoder. Then the decoding is performed in block 906 according to the selected decoding, including checking whether a stop criterium is satisfied, possibly using a threshold, as described above. When the stop criterium is satisfied, outputting the decoded bits is caused in block 907.

Figure 10:
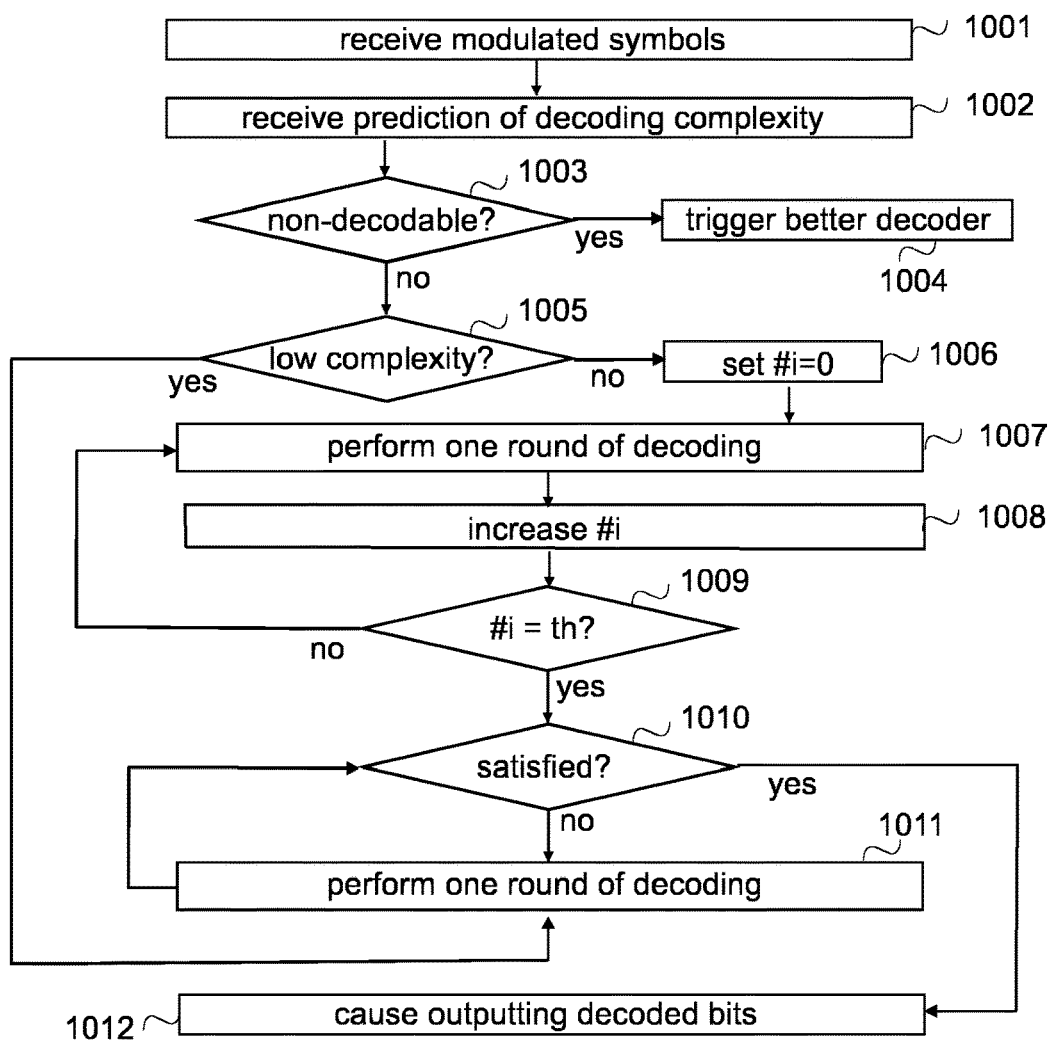

In the example illustrated in FIG. 10, the predictor in a receiver comprises the ternary classifier which predicts the complexity of decoding by outputting one of three classes, and the receiver comprises two or more different decoders which to use.

Referring to FIG. 10, when a stream of modulated symbols is received in block 1001 in the receiver, prediction of the decoding complexity of the modulated symbols is received (outputted) in block 1002.

If the prediction is "non-decodable" (block 1003: yes), the receiver, instead of trying to decode the modulated symbols using the decoder for which the prediction is created, a better decoder is triggered in block 1004. The better decoder may use a more complex decoding algorithm, for example an algorithm based on afterburning decoding principle.

If the prediction is not "non-decodable" (block 1003: no), and the prediction is not "low complexity" (block 1005: no), the prediction is "high complexity", a variable n, which is the number of iteration rounds, is set to be zero in block 1006. Then one round of the belief propagation, i.e. decoding, is performed in block 1007 and the variable n, i.e. the number of iteration rounds, is increased by one in block 1008. Then it is checked in block 1009, whether the number of iteration rounds #i equals to a preset threshold. The preset threshold may be the lower limit of rounds classified to the "high complexity" class, or bigger. If the number of iteration rounds #i does not equal to a preset threshold (block 1009: no), the process returns to block 1007 to perform one round of the belief propagation.

If the number of iterations rounds #i equals to the threshold (block 1009: yes), it is checked in block 1010, whether a stop criterium, for example an early stopping condition of the belief propagation, is satisfied. If it is not (block 1010: no), one iteration round of the belief propagation is performed in block 1011, and the process returns to block 1010 to check, whether a stop criterium is satisfied.

Once the stop criterium is satisfied (block 1010: yes), outputting the decoded bits is caused in block 1012.

If the prediction is "low complexity" (block 1005: yes), one iteration round of the belief propagation is performed in block 1011, and the process proceeds to block 1010 to check, whether a stop criterium is satisfied, and continues therefrom as described above.

Figure 11:
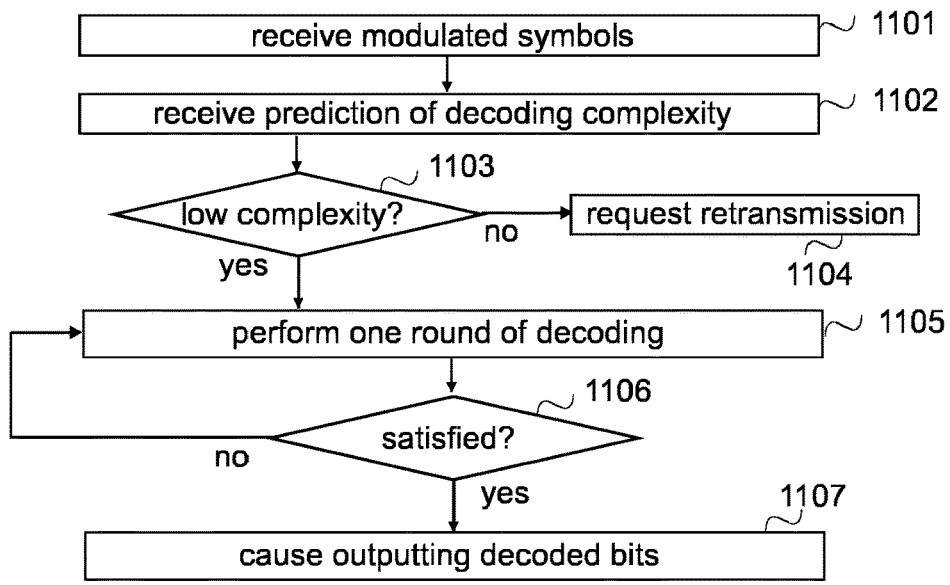

In the example illustrated in FIG. 11, the predictor in a receiver comprises the ternary classifier which predicts the complexity of decoding by outputting one of three classes.

Referring to FIG. 11, when a stream of modulated symbols is received in block 1101 in the receiver, prediction of the decoding complexity of the modulated symbols is received (outputted) in block 1102.

If the prediction is not "low complexity" (block 1103: no), the receiver, instead of trying to decode the modulated symbols, sends in block 1104 a request for retransmission.

If the prediction is "low complexity" (block 1103: yes), one iteration round of the belief propagation is performed in block 1105, and then the process proceeds to block 1106 to check, whether a stop criterium is satisfied. If it is not (block 1106: no), the process returns to block 1105 to perform one iteration round of the belief propagation.

Once the stop criterium is satisfied (block 1106: yes), outputting the decoded bits is caused in block 1107.

Figure 12:
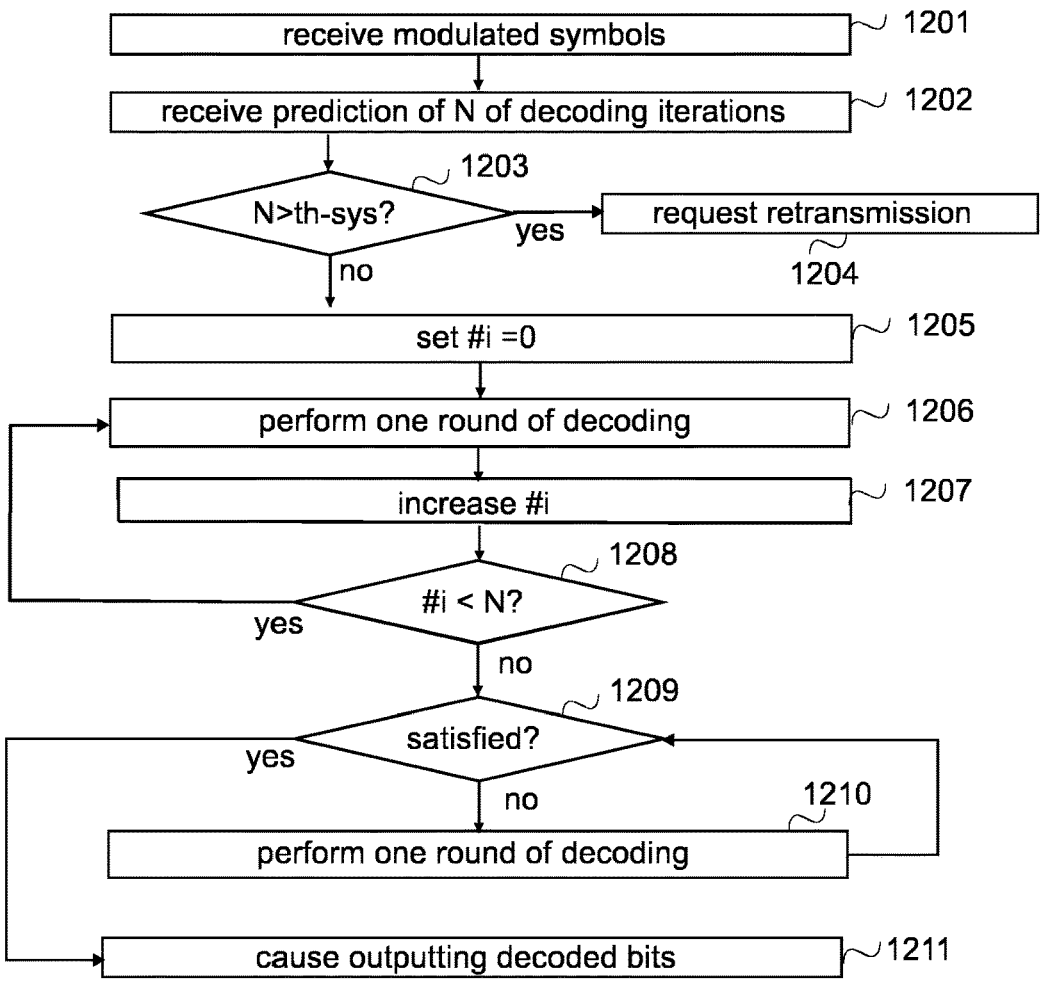

In the example illustrated in FIG. 12, the predictor in a receiver comprises the predictor which predicts the number of iteration rounds.

Referring to FIG. 12, when a stream of modulated symbols is received in block 1201 in the receiver, a prediction of the number N of decoding iterations needed for decoding the modulated symbols is received (outputted) in block 1202. Then it is checked in block 1203, whether the number N (predicted number) is bigger than a system-defined threshold (th-sys). The system-defined threshold is a preset threshold, specified by an application or service that is using the stream. If it is (block 1203: yes), the receiver, instead of trying to decode the modulated symbols and thereby wasting some time in trying to decode the modulated symbols without success, sends in block 1204 a request for retransmission.

If the predicted number N is not bigger than the system-defined threshold (block 1203: no), a variable n, which is the number of iteration rounds, is set to be zero in block 1205, and one round of the belief propagation, i.e. decoding, is performed in block 1206 and the variable n, i.e. the number of iteration rounds, is increased by one in block 1207. Then it is checked in block 1208, whether the number of iteration rounds #i is smaller than the predicted number N. If yes (block 1208: yes), the process returns to block 1206 to perform one round of the belief propagation.

If the number of iterations rounds #i is not smaller than the predicted number N (block 1208: no), it is checked in block 1209, whether a stop criterium, for example an early stopping condition of the belief propagation, is satisfied. If it is not (block 1209: no), one iteration round of the belief propagation is performed in block 1210, and the process returns to block 1209 to check, whether a stop criterium is satisfied.

Once the stop criterium is satisfied (block 1209: yes), outputting the decoded bits is caused in block 1211.

Figure 13:
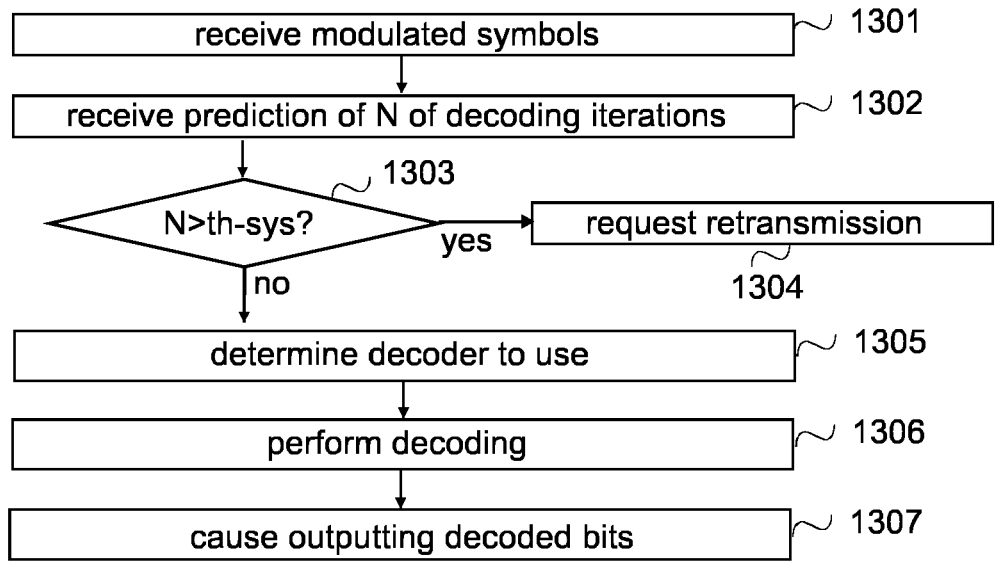

In the example illustrated in FIG. 13, the predictor in a receiver comprises the predictor which predicts the number of iteration rounds, and the receiver comprises two or more different decoders which to use.

Referring to FIG. 13, when a stream of modulated symbols is received in block 1301 in the receiver, a prediction of the number N of decoding iterations needed for decoding the modulated symbols is received (outputted) in block 1302. Then it is checked in block 1303, whether the number N (predicted number) is bigger than a system-defined threshold (th-sys). If it is (block 1303: yes), the receiver sends in block 1304 a request for retransmission.

If the predicted number N is not bigger than the system-defined threshold (block 1303: no), a decoder to use is determined in block 1305, based on the predicted number N. For example, decoding precision of the belief propagation may be determined, or it may be determined, whether to use a min-sum approximation decoder or a layered belief propagation decoder. Then the decoding is performed in block 1306 according to the selected decoding, including checking whether a stop criterium is satisfied, possibly using a threshold, as described above. When the stop criterium is satisfied, outputting the decoded bits is caused in block 1307.

Figure 14:
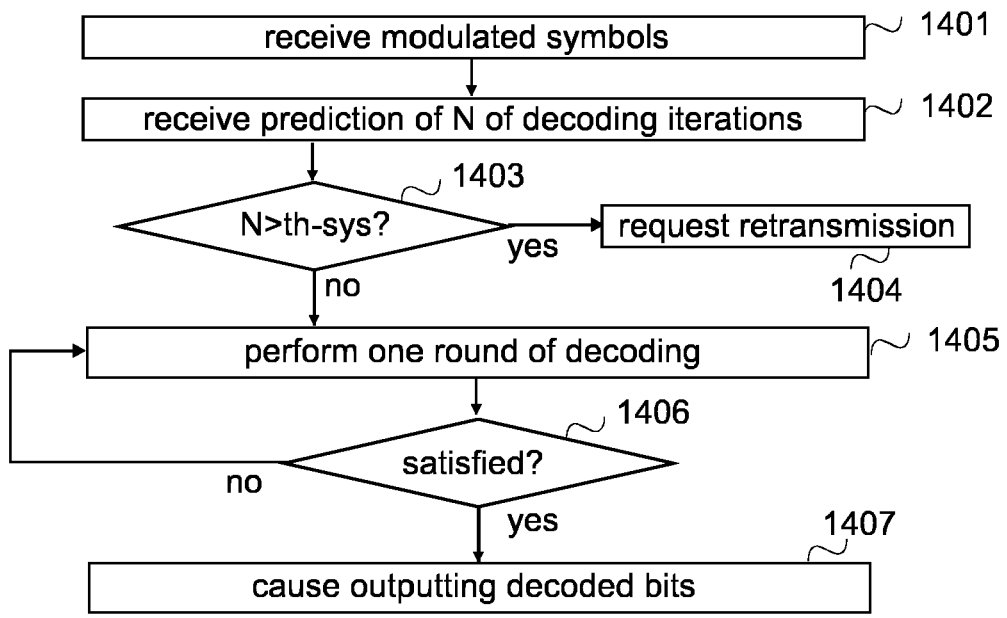

In the example illustrated in FIG. 14, the predictor in a receiver comprises the predictor which predicts the number of iteration rounds.

Referring to FIG. 14, when a stream of modulated symbols is received in block 1401 in the receiver, a prediction of the number N of decoding iterations needed for decoding the modulated symbols is received (outputted) in block 1402. Then it is checked in block 1403, whether the number N (predicted number) is bigger than a system-defined threshold (th-sys). If it is (block 1403: yes), the receiver sends in block 1404 a request for retransmission.

If the predicted number N is not bigger than the system-defined threshold (block 1403: no), one iteration round of the belief propagation is performed in block 1405, and then the process proceeds to block 1406 to check, whether a stop criterium is satisfied. If it is not (block 1406: no), the process returns to block 1405 to perform one iteration round of the belief propagation.

Once the stop criterium is satisfied (block 1406: yes), outputting the decoded bits is caused in block 1407.

As can be seen from the above examples, predictions of decodability of transmission may be used in a plurality of ways, which save time, and thereby minimizes latency caused by decoding, especially when forward error correction codes are used. Further, different solution examples, which reduce decoding complexity, unless it is already low, while still maintaining error-rate performance, are disclosed. In other words, the error-rate performance has no loss or degradation. Further, the decoding algorithms can be used as they are, i.e. without optimizing them.

Figure 15:
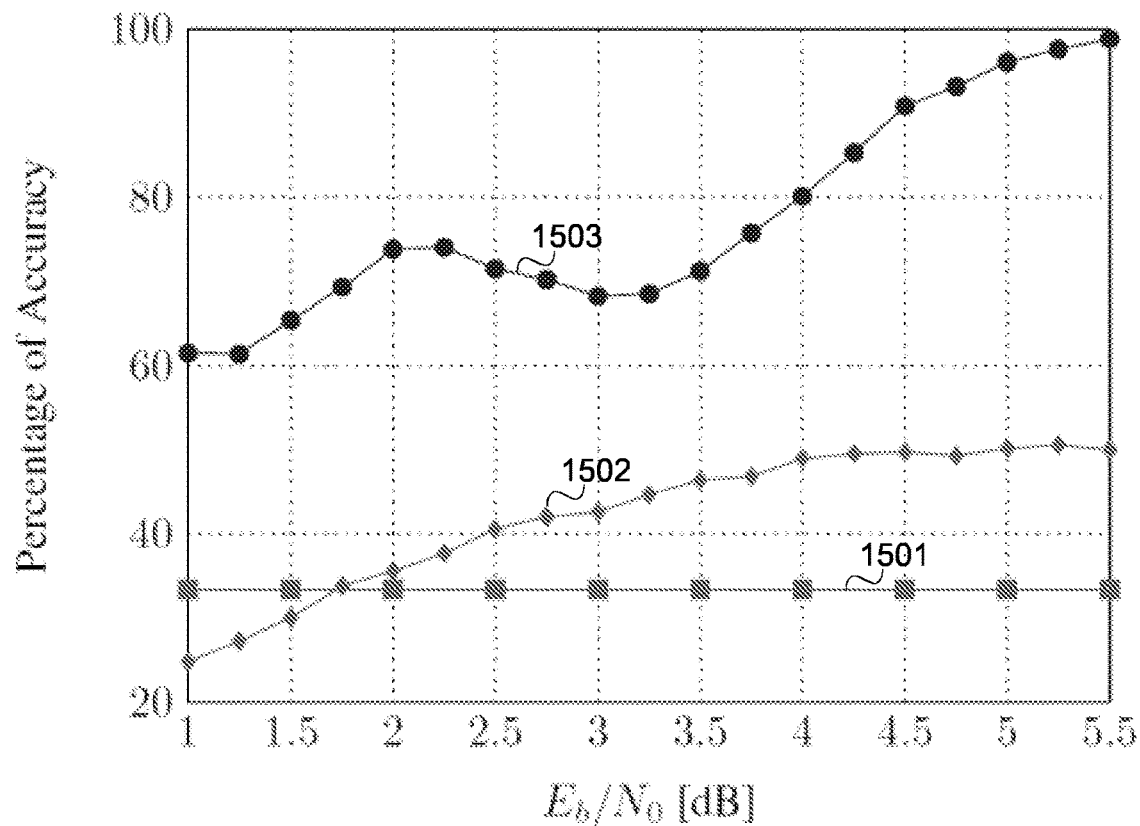
FIGS. 15 and 16 show simulation results of comparative examples.
Figure 16:
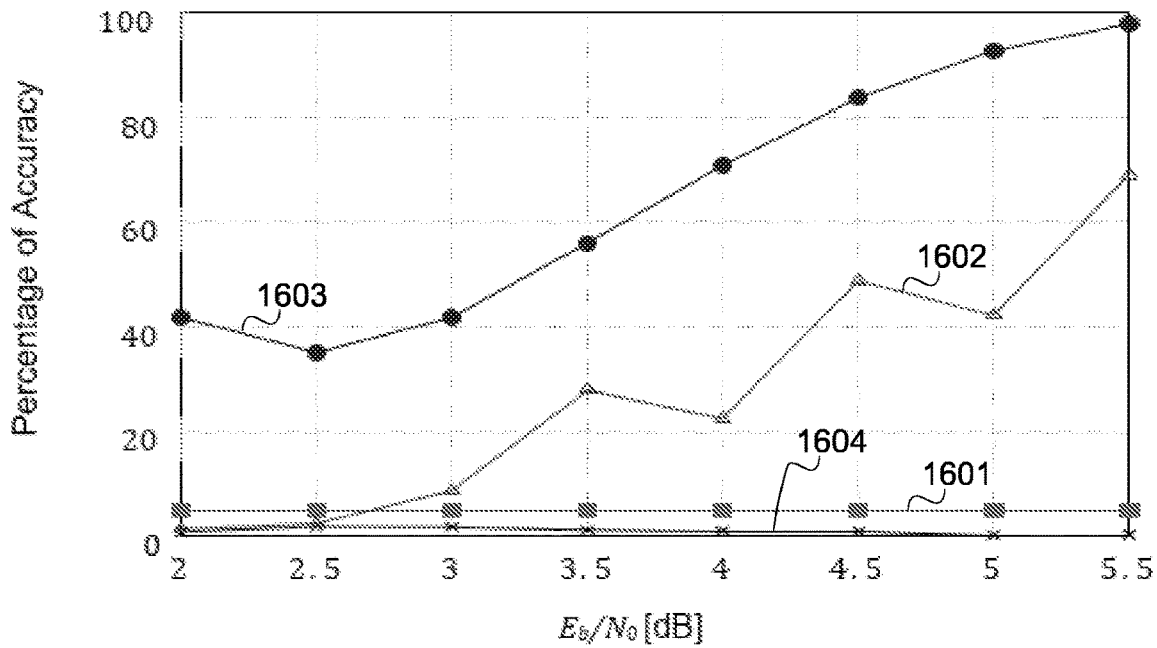

FIGS. 15 and 16 show simulation results of comparative examples with received signal (noisy codeword) y with code length n=128, code dimension k=64 and code rate $R_c$=0.5, when flooding belief propagation decoder with maximum number of iterations $N_{it,max}$=20 is used.

FIG. 15 illustrates percentage of accuracy (fraction of correct predictions) versus signal to noise ratio for different classifiers in predicting complexity of belief propagation decoding. Line 1501 with squares illustrates accuracy of a classifier which randomly selects a decision with equal probabilities for all classes. Line 1502 with diamonds illustrates accuracy of a classifier which is pre-computed via Monte-Carlo simulations per a signal-to-noise ratio to randomly select a decision based on the probability of occurrence per class. Line 1503 with dots illustrates accuracy of the predictor of FIG. 3. (The training set used in Monte-Carlo simulations and for the predictor are the same.)

As can be seen from FIG. 15, the predictor of FIG. 3 is more accurate than the other two, thereby decreasing latency.

FIG. 16 illustrates percentage of accuracy (fraction of correct predictions) versus signal to noise ratio for different classifiers in predicting the number of needed belief propagation iteration rounds for convergence. Line 1601 with squares illustrates accuracy of a classifier which randomly selects a value. Line 1602 with diamonds illustrates accuracy of a look-up table which is pre-computed via Monte-Carlo simulations to have a value (an average) per a signal-to-noise ratio. Line 1603 with dots illustrates accuracy of the predictor of FIG. 3. (The training set used in Monte-Carlo simulations and for the predictor are the same.) line 1604 with crosses illustrates accuracy of a look-up table which is built based on asymptotic analysis, i.e. assuming that an infinite length code with the same degree distribution is used.

The blocks, related functions, and information exchanges described above by means of FIGS. 2 to 14 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information.

Figure 17:
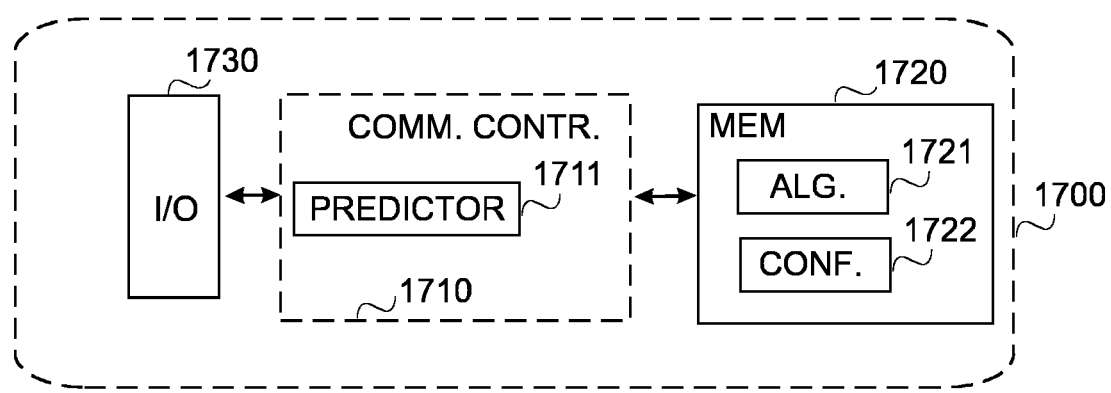
FIGS. 17 and 18 are schematic block diagrams.
Figure 18:
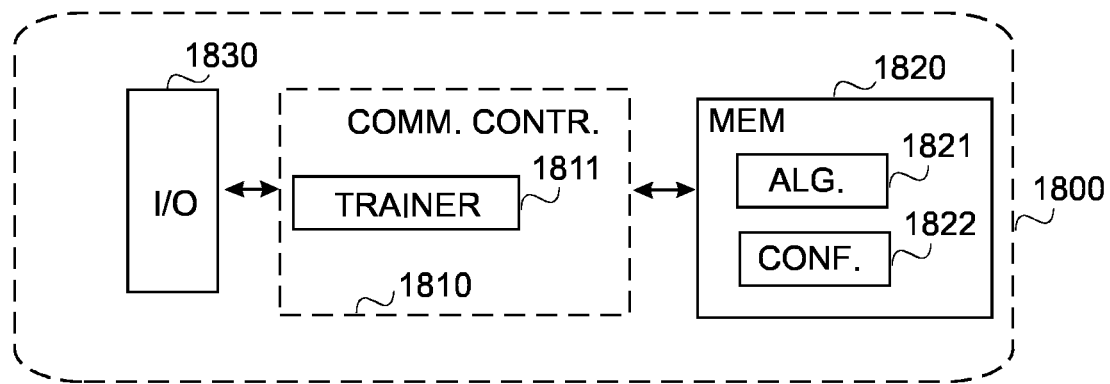

FIGS. 17 and 18 illustrate apparatuses comprising a communication controller 1710, 1810 such as at least one processor or processing circuitry, and at least one memory 1720, 1820 including a computer program code (software, algorithm) ALG. 1721, 1821, wherein the at least one memory and the computer program code (software, algorithm) are configured, with the at least one processor, to cause the respective apparatus to carry out any one of the embodiments, examples and implementations described above. FIG. 17 illustrates an apparatus configured to predict decodability of received data, and FIG. 18 illustrates an apparatus for training the one or more models. Naturally, the apparatuses may be merged, i.e. model(s) trained and (trained)machine learning model(s) used in the same apparatus. The apparatuses of FIGS. 17 and 18 may be electronic devices.

Referring to FIGS. 17 and 18, the memory 1720, 1820 may be implemented using any suitable data storage technology, such as semiconductor based memory devices, flash memory, magnetic memory devices and systems, optical memory devices and systems, fixed memory and removable memory. The memory may comprise a configuration storage CONF. 1721, 1821, such as a configuration database, for at least storing one or more configurations and/or corresponding parameters/parameter values, for example the one or more machine learning models/machine learning model entities, i.e. parameters with values and model architecture, or look-up table(s) and/or training data and/or information to create models for training. The memory 1720, 1820 may further store a data buffer for data waiting for transmission and/or data waiting to be decoded.

Referring to FIG. 17, the apparatus 1700 may further comprise a communication interface 1730 comprising hardware and/or software for realizing communication connectivity at least according to one or more radio communication protocols. The communication interface 1730 may provide the apparatus with radio communication capabilities with one or more base stations (access nodes) of a wireless network, or with radio communication capabilities with one or more user equipment served by the apparatus. The communication interface may comprise standard well-known analog radio components such as an amplifier, filter, frequency-converter and circuitries, conversion circuitries transforming signals between analog and digital domains, and one or more antennas. Digital signal processing regarding transmission and/or reception of signals may be performed in a communication controller 1710, using in the reception the above disclosed machine learning models and/or looked-up tables, for example.

The apparatus 1700 may further comprise an application processor (not illustrated in FIG. 17) executing one or more computer program applications that generate a need to transmit and/or receive data. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. If the apparatus is an access node, the application processor may execute access applications. In an embodiment, at least some of the functionalities of the apparatus of FIG. 17 may be shared between two physically separate devices, forming one operational entity. Therefore, the apparatus may be seen to depict the operational entity comprising one or more physically separate devices for executing at least some of the processes described with respect to a receiver comprised in an apparatus.

The communication controller 1710 may comprise one or more machine learning models (PREDICTOR) 1711 configured to perform predicting decodability according to any one of the embodiments/examples/implementations described above.

Referring to FIG. 18, the apparatus for the training comprises a communication interface 1830 comprising hardware and/or software for realizing communication connectivity according to one or more communication protocols. The communication interface 1830 may provide the apparatus with communication capabilities to apparatuses comprising the one or more machine learning models. The communication interface may comprise standard well-known components such as an amplifier, filter, frequency-converter, (de)modulator, and encoder/decoder circuitries and one or more antennas.

The communication controller 1810 comprises a trainer circuitry TRAINER 1811 configured to train one or more trainable functions for predicting decodablity according to any one of the embodiments/examples/implementations described above, the training covering also generation look-up tables using the Monte-Carlo simulation.

In an embodiment, at least some of the functionalities of the apparatus of FIG. 18 may be shared between two physically separate devices, forming one operational entity. Therefore, the apparatus may be seen to depict the operational entity comprising one or more physically separate devices for executing at least some of the processes described with respect to the training apparatus.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone (smart phone) or a similar integrated circuit in a server, a cellular network device, or another network device.

In an embodiment, at least some of the processes described in connection with FIGS. 2 to 14 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform (carry out) at least some of the functionalities according to any one of the embodiments/examples/implementations of FIGS. 2 to 14, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 14 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor; and
at least one memory including computer program code, the at least one memory and computer program code configured to, with the at least one processor, cause the apparatus at least to perform:
receiving modulated symbols over a channel comprising noise variance related to information indicating at least one of signal-to-noise ratio, estimation of channel state information, or a link quality indicator;
predicting decodability of the modulated symbols based at least upon a decodability complexity by classifying, using a machine learning model, the received modulated symbols to one class of classes indicating complexity of decoding;
determining, based on the decodability, a decoder to use for decoding the received modulated symbols; and
decoding, by the decoder, the received modulated symbols.

2. The apparatus as claimed in claim 1, wherein the at least one memory and computer program code are configured to, with the at least one processor, cause the apparatus further to perform:
requesting a retransmission in response to the class indicating non-decodable.

3. The apparatus as claimed in claim 1, wherein the at least one memory and computer program code are configured to, with the at least one processor, cause the apparatus further to perform:
performing, in response to the class indicating low complexity of decoding, decoding by repeating one round of decoding and checking whether a stop criterion is satisfied until the stop criterion is satisfied.

4. The apparatus as claimed in claim 1, wherein the at least one memory and computer program code are configured to, with the at least one processor, cause the apparatus further to perform:
performing, in response to the class indicating high complexity of decoding, a predetermined number of rounds of decoding before checking whether a stop criterion of the decoding is satisfied.

5. The apparatus as claimed in claim 1, wherein the at least one memory and computer program code are configured to, with the at least one processor, cause the apparatus further to perform:
determining a predicted number of rounds of decoding needed; and
performing, in response to the class indicating high complexity of decoding, a number of rounds of decoding before checking whether a stop criterion of the decoding is satisfied, wherein the number of rounds is based on the predicted number of rounds.

6. The apparatus as claimed in claim 5, wherein the at least one memory and computer program code are configured to, with the at least one processor, cause the apparatus further to perform:
determining the predicted number of rounds by using a machine learning model or using information indicating channel quality of the channel and a look-up table.

7. An apparatus, comprising:
at least one processor; and
at least one memory including computer program code, the at least one memory and computer program code configured to, with the at least one processor, cause the apparatus at least to perform:
receiving modulated symbols over a channel;
predicting decodability of the modulated symbols;
determining, based on the decodability, a decoder to use for decoding the received modulated symbols;
decoding, by the decoder, the received modulated symbols; and
predicting decodability by determining a predicted number of rounds of decoding needed.

8. The apparatus as claimed in claim 7, wherein the at least one memory and computer program code are configured to, with the at least one processor, cause the apparatus further to perform:
requesting a retransmission in response to the predicted number exceeding a predetermined threshold.

9. The apparatus as claimed in claim 7, wherein the at least one memory and computer program code are configured to, with the at least one processor, cause the apparatus further to perform:
performing a number of rounds of decoding before checking whether a stop criterion of decoding is satisfied, wherein the number of rounds is based on the predicted number of rounds.

10. A method, comprising:
receiving modulated symbols over a channel comprising noise variance related to information indicating at least one of signal-to-noise ratio, estimation of channel state information, or a link quality indicator;
predicting decodability of the modulated symbols based at least upon a decodability complexity by classifying, using a machine learning model, the received modulated symbols to one class of classes indicating complexity of decoding;
determining, based on the decodability, a decoder to use for decoding the received modulated symbols; and
decoding, by the decoder, the received modulated symbols.

11. The method as claimed in claim 10, further comprising:
requesting a retransmission in response to the class indicating non-decodable.

12. The method as claimed in claim 10, further comprising:
performing, in response to the class indicating low complexity of decoding, decoding by repeating one round of decoding and checking whether a stop criterion is satisfied until the stop criterion is satisfied.

13. The method as claimed in claim 10, further comprising:
performing, in response to the class indicating high complexity of decoding, a predetermined number of rounds of decoding before checking whether a stop criterion of the decoding is satisfied.

14. The method as claimed in claim 10, further comprising:
determining a predicted number of rounds of decoding needed; and
performing, in response to the class indicating high complexity of decoding, a number of rounds of decoding before checking whether a stop criterion of the decoding is satisfied, wherein the number of rounds is based on the predicted number of rounds.

15. The method as claimed in claim 10, further comprising:
predicting decodability by determining a predicted number of rounds of decoding needed.

16. The method as claimed in claim 15, further comprising:
requesting a retransmission in response to the predicted number exceeding a predetermined threshold.

17. The method as claimed in claim 15, further comprising:
performing a number of rounds of decoding before checking whether a stop criterion of decoding is satisfied, wherein the number of rounds is based on the predicted number of rounds.

18. An apparatus, comprising:
at least one processor; and
at least one memory including computer program code, the at least one memory and computer program code configured to, with the at least one processor, cause the apparatus at least to perform:
receiving modulated symbols over a channel;
predicting decodability of the modulated symbols based at least upon a decodability complexity by classifying, using a machine learning model, the received modulated symbols to one class of classes indicating complexity of decoding;
determining, based on the decodability, a decoder to use for decoding the received modulated symbols; and
decoding, by the decoder, the received modulated symbols.

* * * * *